United States Patent
Fragstein et al.

(10) Patent No.: US 11,020,924 B2
(45) Date of Patent: Jun. 1, 2021

(54) RAIL SYSTEM FOR A TRAVELLING CHUTE OF A RUBBER BALER AND RELATED BALING METHODS

(71) Applicant: Karltex Machine, Inc., Orange, TX (US)

(72) Inventors: Sig Fragstein, Orange, TX (US); Donnie L. Cobb, Orange, TX (US); Carl Johnson, Orange, TX (US); Paul Sozzi, Orange, TX (US)

(73) Assignee: Karltex Machine, Inc., Orange, TX (US)

( * ) Notice: Subject to any disclaimer, the term of this patent is extended or adjusted under 35 U.S.C. 154(b) by 273 days.

(21) Appl. No.: 16/361,383

(22) Filed: Mar. 22, 2019

(65) Prior Publication Data
US 2020/0298523 A1    Sep. 24, 2020

(51) Int. Cl.
*B30B 9/30* (2006.01)
*B30B 15/02* (2006.01)
(Continued)

(52) U.S. Cl.
CPC .......... *B30B 9/3057* (2013.01); *B29B 15/026* (2013.01); *B30B 9/301* (2013.01);
(Continued)

(58) Field of Classification Search
CPC ..... B30B 9/301; B30B 9/3057; B30B 9/3014; B30B 9/3021; B30B 9/3096;
(Continued)

(56) References Cited

U.S. PATENT DOCUMENTS

| | | | |
|---|---|---|---|
| 1,998,166 | A | 4/1935 | Nelson |
| 2,488,395 | A | 11/1949 | Goldberg |

(Continued)

FOREIGN PATENT DOCUMENTS

| | | |
|---|---|---|
| CN | 202923005 U | 5/2013 |
| CN | 203485469 U | 3/2014 |

(Continued)

OTHER PUBLICATIONS

International Baler Corp. HCB Series Crumb Rubber Balers Product Brochure. First accessed Mar. 2, 2020.
(Continued)

*Primary Examiner* — Jimmy T Nguyen
(74) *Attorney, Agent, or Firm* — Beem Patent Law Firm

(57) ABSTRACT

Improved balers may include a traveling chute that may reduce wear and tear and maintenance, and/or improve efficiency by reducing downtime. The traveling chute may include moving guides that include channels that engage tongues of stationary guide rails disposed on a baler. For example, the channels may be substantially rectangular channels that run the length of the moving guide. Similarly, the stationary guides may include substantially rectangular tongues and the moving guides may slide across the tongues and upper surfaces of the stationary guides as the traveling chute moves between various positions. The moving guides may include polyoxymethylene inserts in which the channels may be provided. The moving guides and stationary guides may be provided as a kit for attachment to various baling apparatuses. Additional features and components also are described.

20 Claims, 9 Drawing Sheets

(51) Int. Cl.
B30B 15/06 (2006.01)
B29B 15/02 (2006.01)

(52) U.S. Cl.
CPC .......... B30B 9/3014 (2013.01); B30B 9/3021 (2013.01); B30B 15/026 (2013.01); B30B 15/068 (2013.01); *F16C 2322/00* (2013.01)

(58) Field of Classification Search
CPC ... B30B 9/3085; B30B 15/026; B30B 15/068; B30B 15/30; B30B 15/302; B30B 15/304; B30B 13/00; B29B 15/026; F16C 3/03; F16C 2322/00
USPC .......................................... 100/215, 216, 217
See application file for complete search history.

(56) References Cited

U.S. PATENT DOCUMENTS

| | | | |
|---|---|---|---|
| 2,748,694 | A | 6/1956 | Thompson |
| 3,025,785 | A | 3/1962 | Deems |
| 3,107,604 | A | 10/1963 | Deems |
| 3,139,676 | A | 7/1964 | Grover |
| 3,176,808 | A | 4/1965 | Matthews |
| 3,377,553 | A | 4/1968 | Lillard |
| 3,554,060 | A | 1/1971 | Gargrave et al. |
| 3,583,312 | A | 6/1971 | Van Doorn |
| 3,655,851 | A | 4/1972 | Shelton et al. |
| 3,765,324 | A | 10/1973 | O'Neill |
| 3,887,685 | A * | 6/1975 | Stelzmuller ............. B30B 11/02 425/260 |
| 3,895,572 | A | 7/1975 | Nitschke |
| 4,024,807 | A | 5/1977 | Karsen |
| 4,127,062 | A | 11/1978 | Egosi |
| 4,206,699 | A | 6/1980 | Hemmelgarn |
| 4,273,037 | A | 6/1981 | Ruebesam |
| 4,287,823 | A | 9/1981 | Thompson |
| 4,826,416 | A | 5/1989 | Majerus |
| 4,929,141 | A | 5/1990 | Keesey et al. |
| 5,125,210 | A * | 6/1992 | Lang .................... B30B 9/3003 53/176 |
| 5,694,742 | A | 12/1997 | Elliott et al. |
| 5,768,932 | A | 6/1998 | Hahn |
| 5,870,951 | A | 2/1999 | Fragstein |
| 6,074,738 | A | 6/2000 | von Fragstein |
| 6,170,392 | B1 | 1/2001 | Watercutter |
| 6,256,969 | B1 | 7/2001 | Fragstein |
| 6,261,678 | B1 | 7/2001 | von Fragstein |
| 6,293,759 | B1 | 9/2001 | Thut |
| 6,352,023 | B1 | 3/2002 | Dunaway |
| 6,776,361 | B1 | 8/2004 | Watanabe et al. |
| 10,343,362 | B1 * | 7/2019 | Fragstein .............. B30B 15/304 |
| 10,807,338 | B2 * | 10/2020 | Fragstein .............. F04B 53/147 |
| 2017/0190450 | A1 | 7/2017 | Wildes et al. |
| 2017/0219003 | A1 | 8/2017 | Hwang et al. |

FOREIGN PATENT DOCUMENTS

| | | |
|---|---|---|
| DE | 202014106240 U1 | 5/2016 |
| DE | 102017102278 A1 | 8/2018 |

OTHER PUBLICATIONS

International Baler Service of Sweden website home page. First accessed Mar. 2, 2020. URL: http://www.internationalbaler.com/.
International Baler Service GmbH of Germany website home page. First accessed Mar. 2, 2020. URL: https://ibs-baler.de/.
Notification of Transmittal of the International Search Report and Written Opinion dated Apr. 25, 2017, issued in International Application No. PCT/US2016/069471 (17 pages).

* cited by examiner

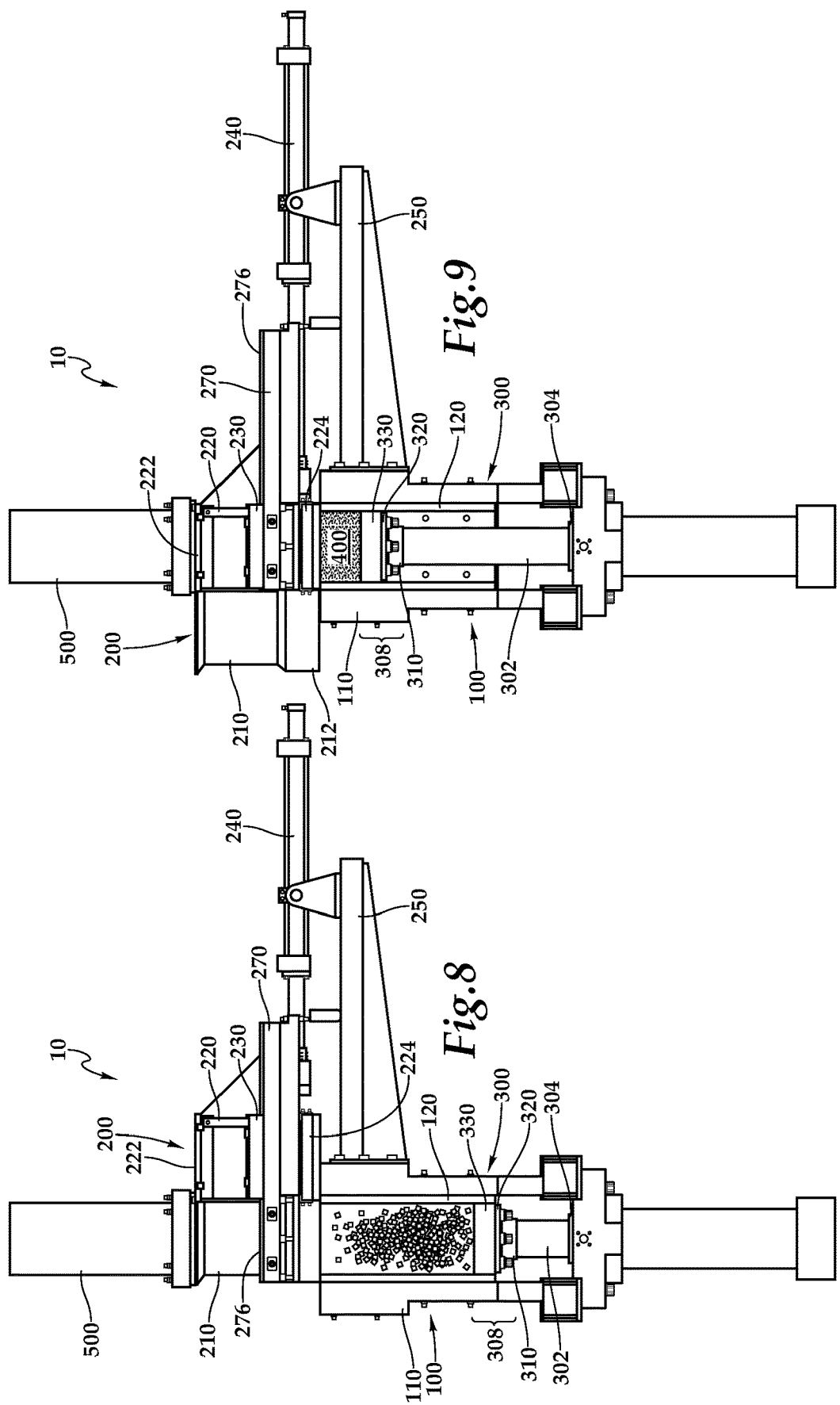

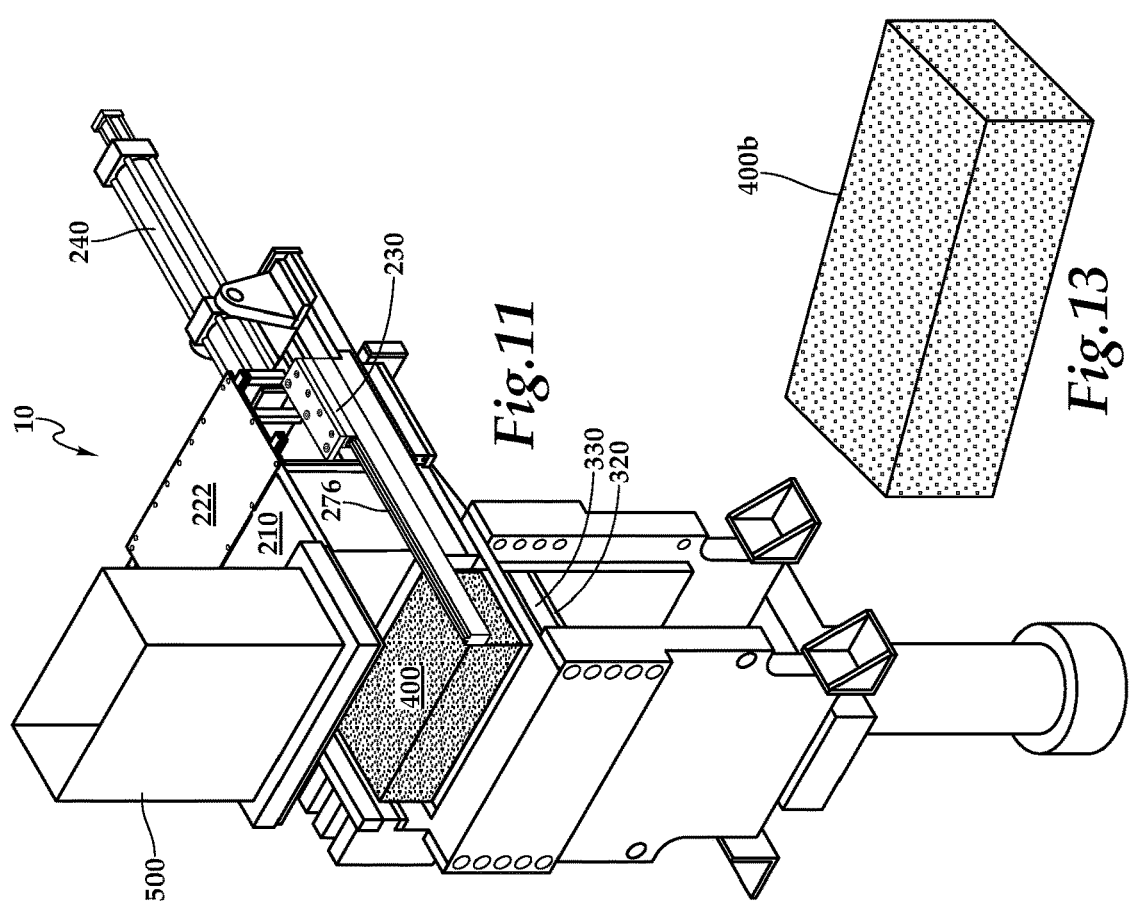
Fig.11
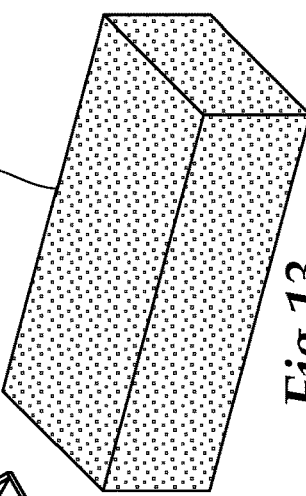
Fig.13
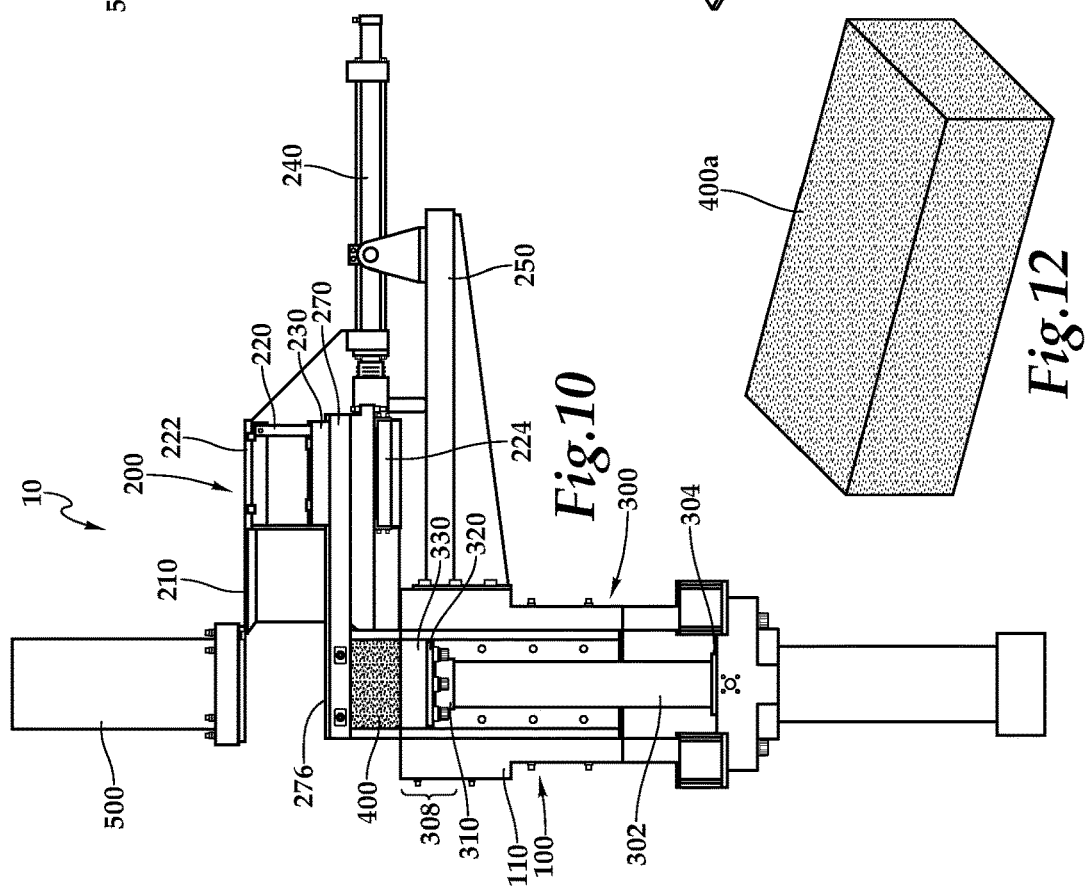
Fig.10
Fig.12

RAIL SYSTEM FOR A TRAVELLING CHUTE OF A RUBBER BALER AND RELATED BALING METHODS

RELATED APPLICATIONS

The present application is related to U.S. Pat. No. 9,878,511 issued Jan. 30, 2018, U.S. Pat. No. 10,189,224 issued Jan. 29, 2019, U.S. patent application Ser. No. 15/948,780 filed Apr. 9, 2018, and U.S. patent application Ser. No. 16/235,164 filed Jan. 3, 2019, all of which are incorporated by reference in their entirety.

BACKGROUND OF THE INVENTION

1. Technical Field

The present invention relates to rubber bales and baling equipment, and more particularly to equipment that uses a traveling chute to direct compressible material into a press chamber and/or eject a bale from the press chamber.

2. Related Art

Rubber baling is, ideally, a twenty-four hours a day, seven days a week endless process. In reality, rubber is a notoriously difficult material to handle and its complexities and characteristics dictate that baling machines must be periodically maintained. For example, rubber must be handled with care, taking into consideration its various intended uses, some of which are for food or pharmaceutical grade rubber. Especially for the latter purpose, contamination must be avoided. A change of product may require complete cleaning of equipment, sometimes requiring disassembly, particularly of balers.

Color, which may be white or transparent, must be considered. Irregularities such as "teats" remaining on the outer surfaces of bales after forming at high pressure—the teats corresponding to small holes or crevices in the baling machine—are undesirable but inevitable as artifacts of the baling process. Sometimes teats break off in the machine and remain lodged there for several cycles, transforming in color from white to gray, and then sometimes coming loose and being molded into a bale which is then ejected with a discolored teat, which can result in rejection of the bale, especially in pharmaceutical grades and the like. Maintenance is demanding. Heavy pieces of equipment must be maneuvered in tight, crowded spaces. Each second of downtime is lost profit.

After synthetic rubber is dried in large sheets, it is crumbled and baled. The pieces are larger—some of them becoming fused together—or smaller with a great deal of dust—all of which is desired to be formed into bales. The crumbles may vary in size depending on their Mooney rating. For example, dry, low Mooney crumbles may be between about the size of talcum powder or dust to about the size of a walnut, while wet, sticky, high Mooney crumbles may be between about the size of a walnut to about the size of an orange.

During a typical baling process, crumbles are deposited into a drop chamber where they are weighed atop a set of trap doors. Once the appropriate amount of crumbles are present, the doors open and the crumbles travel the remaining portion of the drop chute, through a traveling chute positioned atop the press chamber. The traveling chute then moves to position panels that close the press chamber below and the drop chute above. While the crumbles are compressed in the press chamber by a hydraulic ram to form a bale, the next batch of crumbles is deposited and weighed atop the trap doors above. Once the bale is formed, the traveling chute moves again so the bale can be ejected from the press chamber and sent off for further processing. The process then repeats.

Traditionally, the traveling chute moves between positions by rolling along a flat guide rail via four wheels attached to the sides of the traveling chute, two wheels on each side. To keep the traveling chute properly aligned on the rails, wear strips are provided that sit between the sides of the traveling chute and inner surfaces of the guide rails. This arrangement causes friction that eventually leads to the deterioration of the wear strips and misalignment of traveling chute. In addition, the massive weight of the traveling chute, typically about 1,500-2000 lbs., is supported only at the four wheels. This configuration causes stress and the eventual breakage of the wheels. All of these problems increase service time and decrease profits.

Accordingly, a need has long existed for even further improved systems and methods for rubber baling.

SUMMARY

Improved balers may include a traveling chute that may reduce wear and tear and maintenance, and/or improve efficiency by reducing downtime. The traveling chute may include moving guides that include channels that engage tongues of stationary guide rails disposed on a baler. For example, the channels may be substantially rectangular channels that run the length of the moving guide. Similarly, the stationary guides may include substantially rectangular tongues and the moving guides may slide across the tongues and upper surfaces of the stationary guides as the traveling chute moves between various positions. The moving guides may include polyoxymethylene inserts in which the channels may be provided. The moving guides and stationary guides may be provided as a kit for attachment to various baling apparatuses.

Other systems, methods, features and technical advantages of the invention will be, or will become apparent to one with skill in the art, upon examination of the figures and detailed description. It is intended that all such additional systems, methods, features and technical advantages be included within this summary and be protected by the claims.

BRIEF DESCRIPTION OF THE DRAWINGS

The invention can be better understood with reference to the following drawings and description. The components in the figures are not necessarily to scale, emphasis instead being placed upon illustrating the principles of the invention.

FIGS. 8-11 show side and perspective views of the exemplary baler press assembly of FIG. 1 at various stages of a bale forming process; and FIGS. 12-13 show exemplary rubber bales formed using the exemplary baler press assembly of FIG. 1.

DETAILED DESCRIPTION OF THE PREFERRED EMBODIMENTS

The elements illustrated in the figures interoperate as explained in more detail below. Before setting forth the detailed explanation, however, it is noted that all of the discussion below, regardless of the particular implementation being described, is exemplary in nature, rather than limiting.

1.0 Baler Assembly Overview

Figure 1:
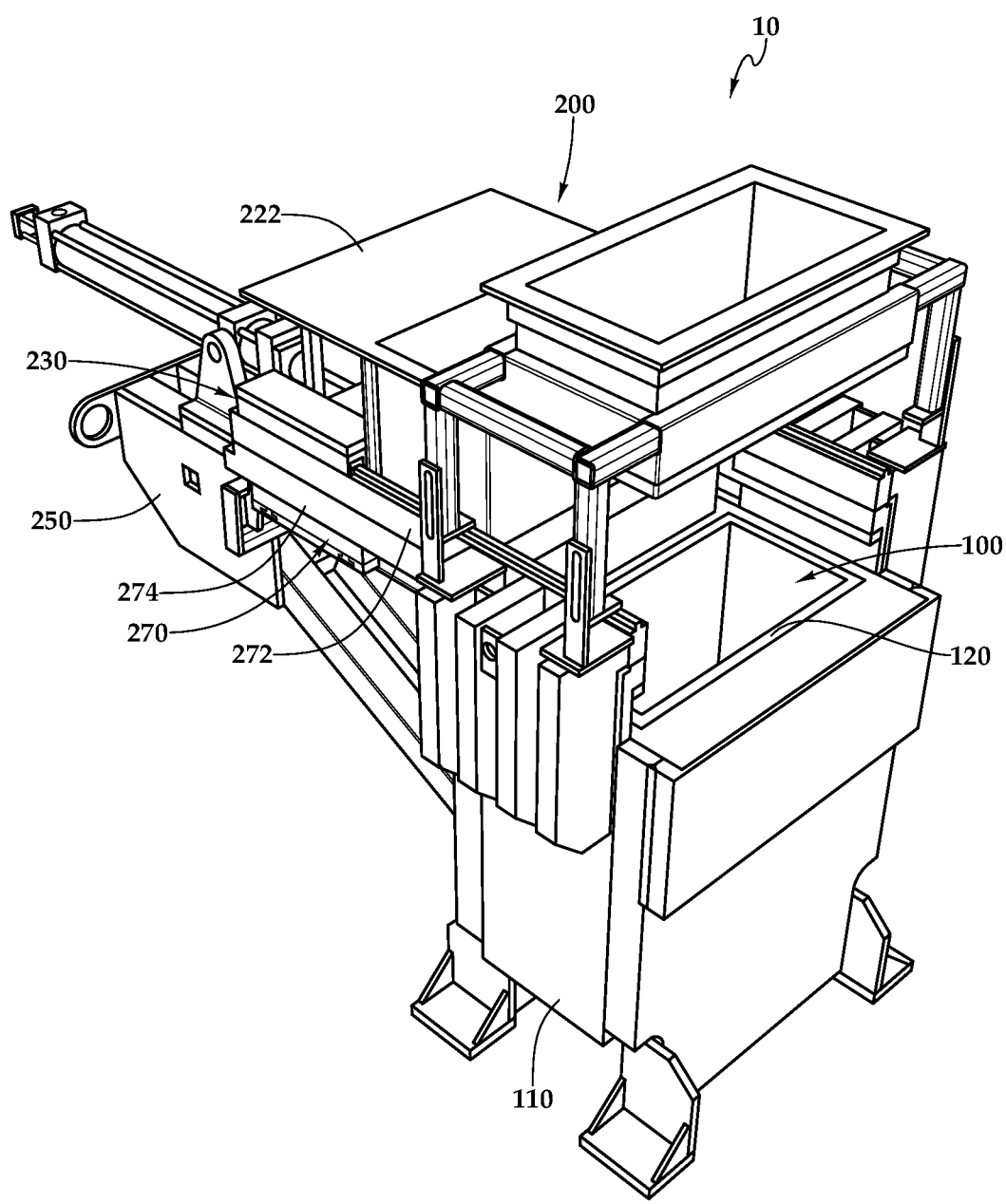
FIG. 1 shows a perspective view of an exemplary baler press assembly.
Figure 2:
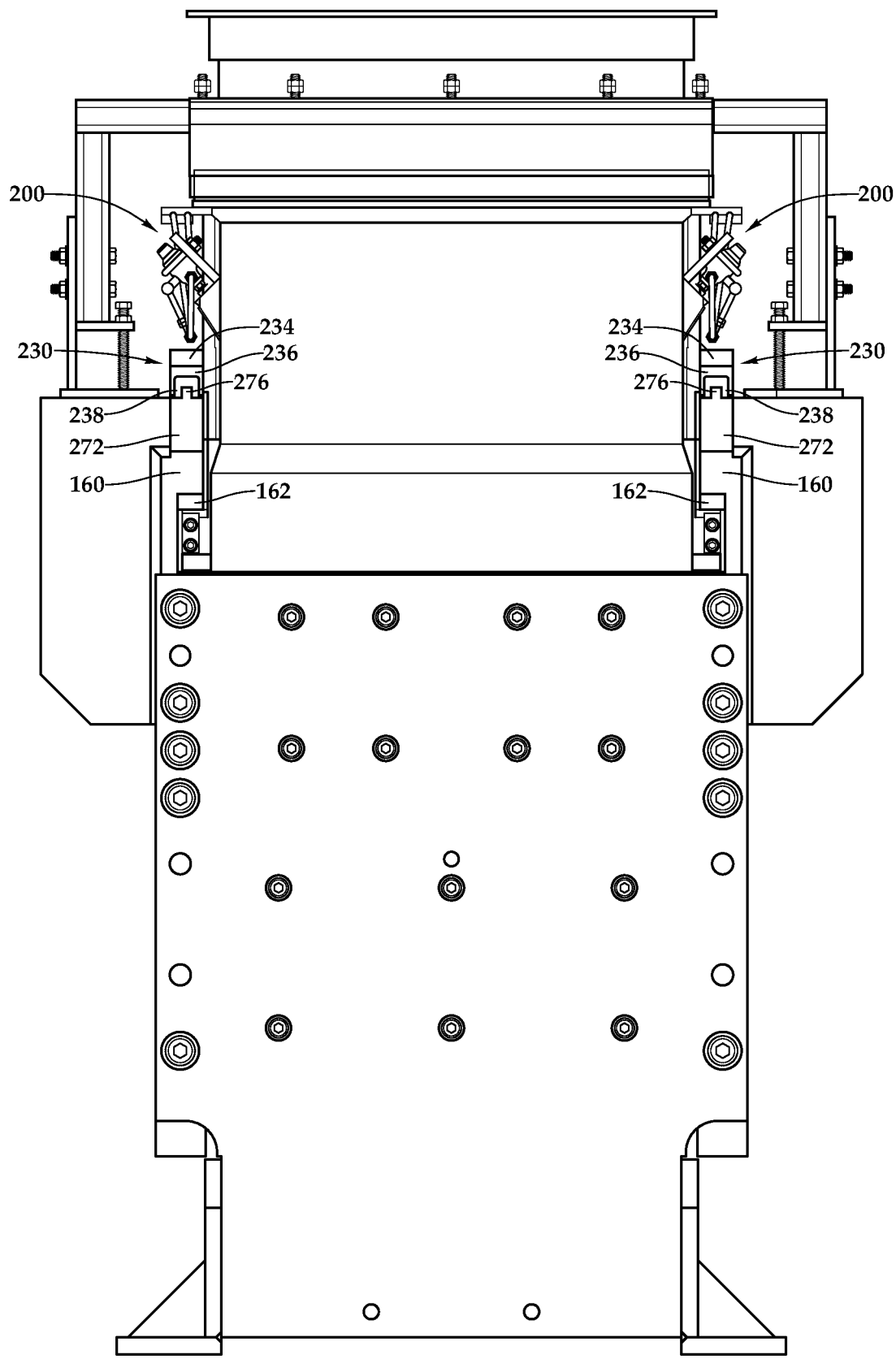
FIG. 2 shows a front cross-sectional view an exemplary baler press assembly with an exemplary air blasting crumb chute for use in a baler press assembly.
Figure 3:
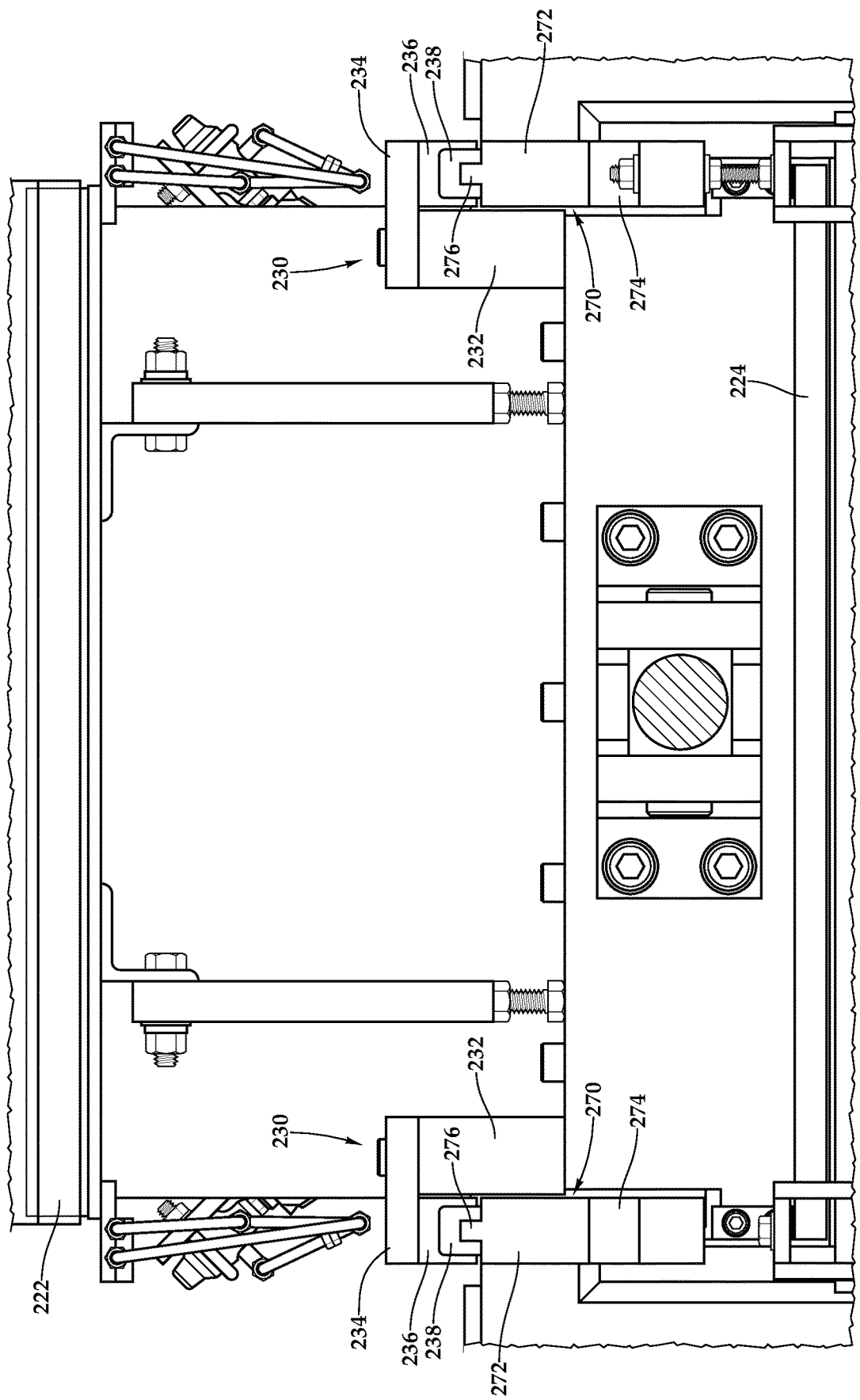
FIG. 3 shows a back view of an exemplary traveling chute having moving guides.

Referring to the drawings, and initially to FIGS. 1-3, a perspective view, a front view and a back view of an exemplary upstroke baler press assembly 10 are shown. Only relevant portions of the baler press assembly 10 are shown; other portions are well known to those skilled in the art and are not discussed herein for sake of clarity. In the illustrated embodiment, the baler press assembly 10 may include a press chamber 100, a traveling chute assembly 200 and a ram assembly 300 (FIG. 8). The press chamber 100 may include press walls 110 that function to provide a rigid support capable of withstanding at least the compression forces necessary to form the bale (described below). Press wall liners 120 may be secured to the inside of the press walls 110, such as by means of socket cap screws. Other types of securing mechanisms also may be used in place of the socket cap screws.

The ram assembly 300 (FIG. 8-11) may include a hydraulic rod 302 positioned within a rod housing and scraper 304. A bolster assembly 308 may be secured to the end of the hydraulic rod 302. Hydraulic power from the power unit may be supplied to the baler press assembly 10 at a number of power connection points.

2.0 Exemplary Traveling Chutes 200

Referring to FIGS. 1-2, an exemplary baler 10 having stationary guides 270 that engage moving guides 230 of a traveling chute 200 is shown in perspective and back views. The baler 10 may include stationary guides 270 that each include a tongue 276 extending from their upper surfaces 275. The moving guides 230 may be coupled to the traveling chute and each may include a channel 239 (FIG. 5) that runs substantially the length of the moving guide 230. In operation, the traveling chute 200 may be positioned atop the stationary guides 270 so that the tongues 276 engage the channels 239 and provide tracks along which the traveling chute 230 may slide as it moves between various operational positions. Because the moving guides 230 may engage the stationary guides 270 along the length of the channel 239, the weight of the traveling chute 200 may be better distributed, reducing the stress on any particular component. In addition, the tongues 276 also better align the traveling chute 200 atop the baler 10, eliminating the need for wear strips between the traveling chute 200 and the guides 270. As a result, overall efficiency of the baling process is increased as downtime and maintenance requirements stemming from misalignment are reduced.

2.1 Exemplary Moving Guides 230

Figure 4:
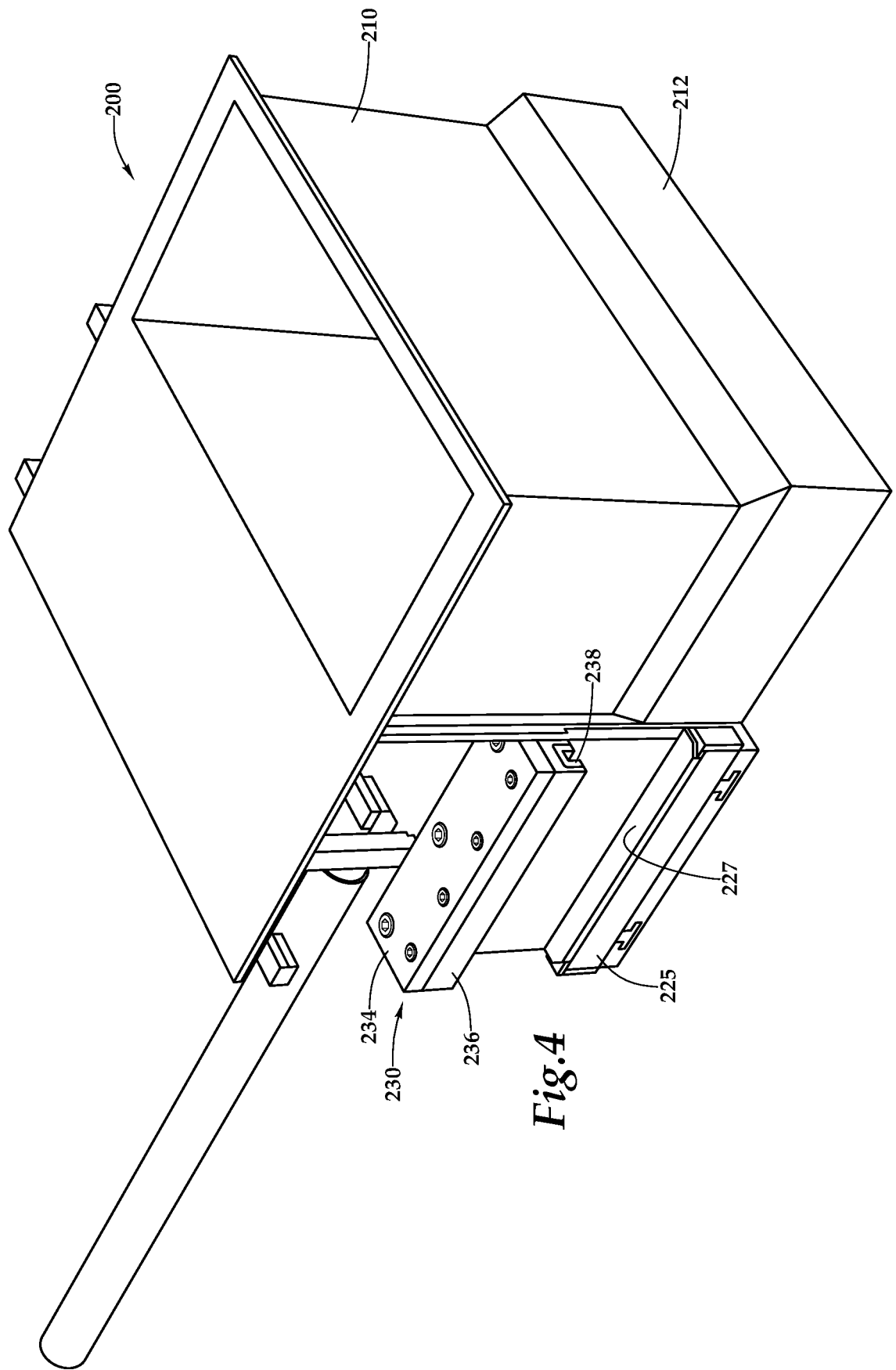
FIG. 4 shows a perspective view of an exemplary traveling chute having moving guides.
Figure 5:
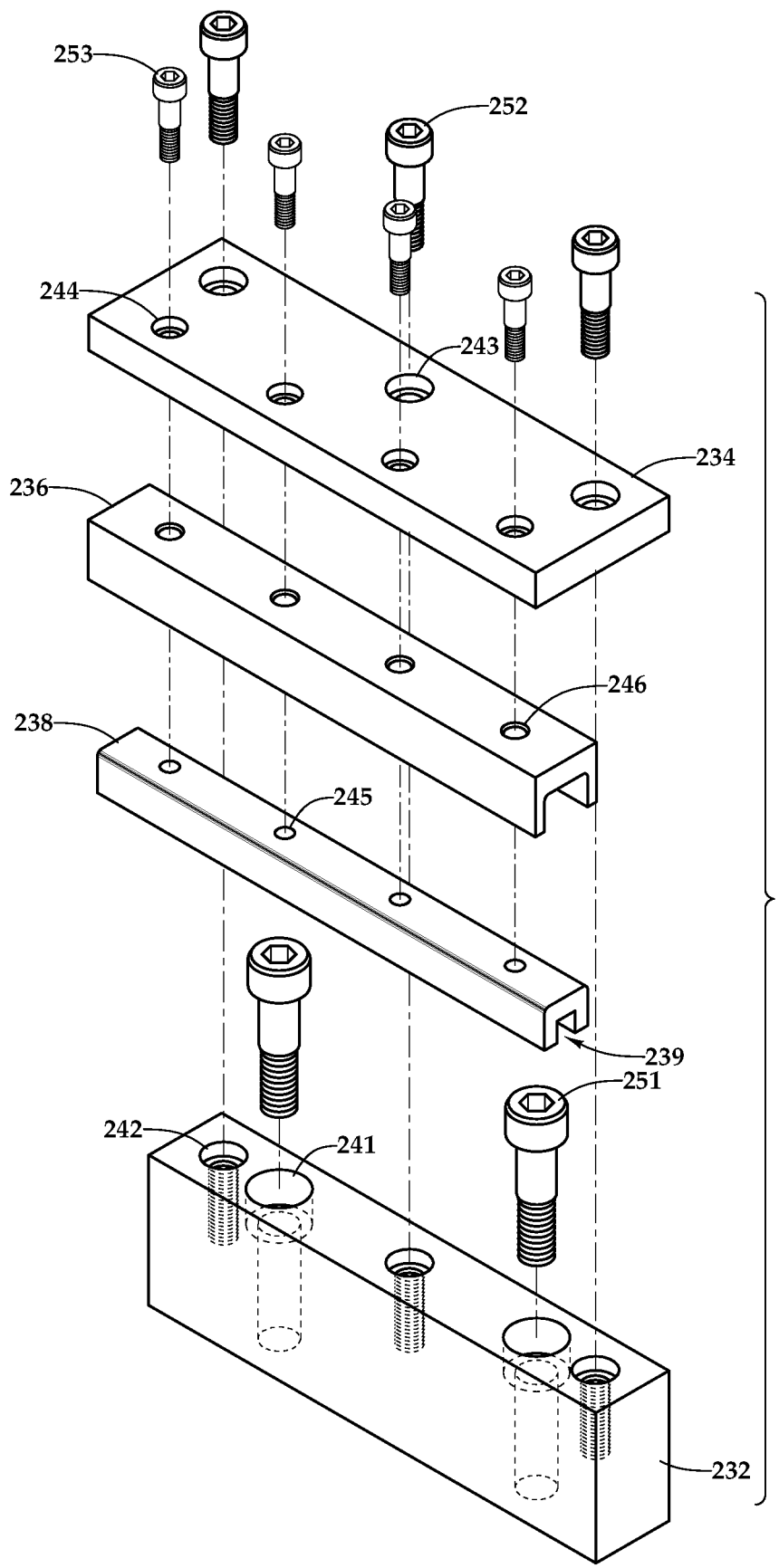
FIG. 5 shows an exploded view of an exemplary moving guide.

FIGS. 3 and 4 show an exemplary traveling chute 200 having moving guides 230 in a back view and perspective view, respectively, and FIG. 5 shows an exploded view of an exemplary moving guide 230. The moving guide 230 may include a mounting block 232, a wing bar 234, a moving guide encasement 236 and an insert 238. The mounting block 232 may be coupled to the traveling chute 200, such as by bolts 251, welding or the like, and may provide a base for the rest of the moving guide 230. The wing bar 234 may be coupled to the top of the mounting block 232, such as by bolts 252 or other means, and may extend horizontally outward from the main body of the traveling chute 200. The moving guide encasement 236 may be coupled to the wing bar 237, such as by bolts 253, welding or the like, and may provide a rigid support structure for the insert 238. The insert 238 may be coupled to the encasement 236 and may provide the channel 239 for engaging the tongue 276 of the stationary guide 270. In some embodiments, the encasement 236 and insert 238 may be combined in a unitary structure, or the encasement 236 may include the features of the insert 238 (e.g. may define a channel 239 for engaging the tongue 276 of the stationary guide 270. In some embodiments, bolts 253 may be provided that couple the wing bar 234, encasement 236 and insert 238 to one another.

The insert 238 may include a body having a plurality of cavities 246 and a channel 239. The body may be made of any suitable material, such as plastic, metal or the like, and preferably is made of a thermoplastic polymer, such as polyoxymethylene or the like. As used herein, the term "thermoplastic polymer" is defined to encompass the DuPont materials Delrin® and Delrin AF® and any other materials having similar relevant properties. Delrin® is an acetal resin thermoplastic polymer (or acetal homopolymer) manufactured by the polymerization of formaldehyde. Delrin AF® contains high tensile strength fibers of Teflon® fluoroplastic resin. Similar wear resistant materials having low static and dynamic coefficients of friction (as compared to steel) and capable of being formed into or bonded to inserts or wear strip are considered to fall within the scope of the term thermoplastic polymer as used herein. Cavities 246 may be threaded and may receive bolts 253 for coupling the insert 238 to the lower encasement 236 and/or the wing bar 234.

The insert 238 may be dimensioned to engage the upper surface 275 of the upper guide member 272 of the stationary guide rail 270 in a manner that better distributes the weight of the traveling chute 200 than traditional systems. For example, the insert 239 may be between about 5 inches and about 25 inches, preferably between about 10 inches and about 20 inches, and even more preferably between about 12 inches and about 18 inches. In the illustrated embodiment, the insert 238 is about 15 inches long and engages the upper surface 275 of the upper guide member 272 on each side of the tongue 276 for the entire length of the insert 238. As a result, the weight of the traveling chute 200 is better dispersed than in traditional wheeled systems.

In addition, the channel 239 of the insert 238 also may be dimensioned to provide a clearance between the insert 238 and the stationary rail 270. In other words, the channel 239 may be wider and/or taller than the tongue 276 of the stationary rail 270. For example, the clearance between the insert 238 and the tongue 276 may be between about $1/1000$ inch and about $30/1000$ inch, preferably between about $5/1000$ inch and about $25/1000$ inch, and even more preferably between about $1/100$ inch and about $1/50$ inch. In the illustrated embodiment, the channel 239 is about 15/1000 inch wider and taller than the tongue 276 of the stationary rail 270. Other clearances also may be used.

The encasement 236 may include apertures 245 and the the wing bar 234 may include apertures 244 for receiving bolts 253 for coupling the encasement 236 and wing bar 234 to one another and/or the insert 238. In addition, the wing bar 234 also may include apertures 243 and the mounting block 232 may include cavities 242 for receiving bolts 252 for coupling the wing bar 234 to the mounting block 232. Finally, the mounting block 232 also may include apertures 241 for receiving bolts 251 for coupling the mounting block to the traveling chute 200. The apertures 245, 244, 243, and 241 and the cavities 246 and 242 all may be threaded to facilitate reception of the bolts 253, 252 and 251.

The mounting block 232, wing bar 234 and encasement 236 may be made of any suitable, rigid material, such as stainless steel or the like. In the illustrated embodiments, the mounting block 232, wing bar 234 and encasement 236 are made of 316 stainless steel. Other materials also may be used.

In some embodiments, the mounting block 232, wing bar 234 and encasement 236 may have substantially similar lengths. For example, these components may have a length between about 5 inches and about 25 inches, preferably between about 10 inches and about 20 inches, and even more preferably between about 12 inches and about 18 inches. In the illustrated embodiment, the mounting block 232, wing bar 234 and encasement 236 are each about 15 inches long. Other sizes also may be used.

The wing bar 234 may have a width substantially equal to the combined widths of the mounting block 232 and the encasement 236. For example, the wing bar 234 may have a width between about 2 inches and about 10 inches, preferably between about 3 inches and about 8 inches, and even more preferably between about 4 inches and about 6 inches. In the illustrated embodiment, the wing bar 234 is about 4½ inches wide. Other sizes also may be used.

In some embodiments, the encasement 236 may have a width substantially equal to width of the stationary guide 270. Alternatively, the encasement may have a width that is smaller or larger than the width of the stationary guide 270. For example, in some embodiments, the insert 238 may have a width substantially equal to width of the stationary guide 270 and the encasement 236 may be wider to accommodate the size of the insert 238. The encasement 236 may have a width between about 1 inches and about 7 inches, preferably between about 1¼ inches and about 6 inches, and even more preferably between about 1½ inches and about 3½ inches. In the illustrated embodiment, the encasement 236 is about 2 inches wide. Other sizes also may be used.

2.2 Exemplary Stationary Guides 270

Figure 6:
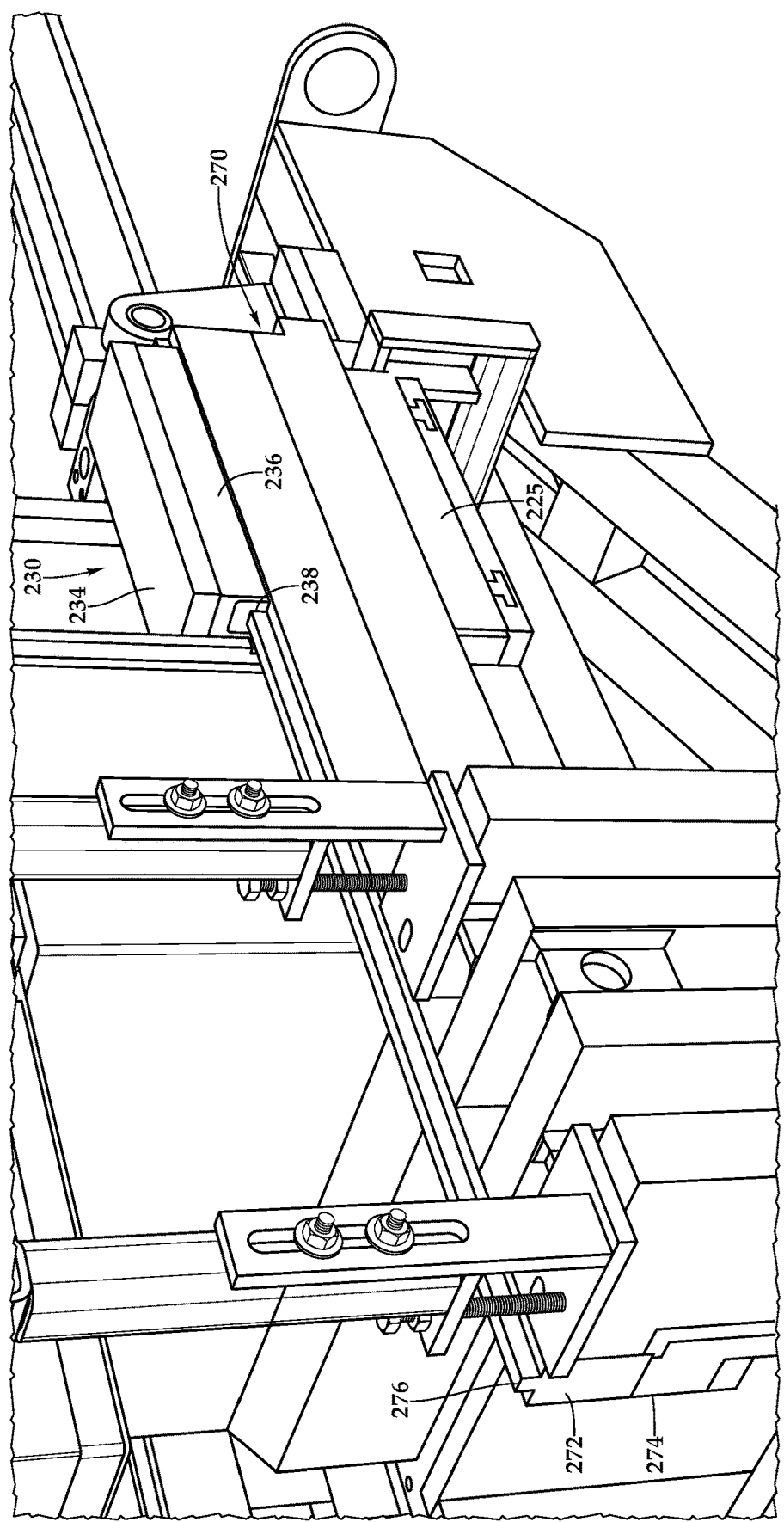
FIG. 6 shows a perspective view of a portion of an exemplary stationary guide of a baler assembly for engaging an exemplary moving guide.
Figure 7:
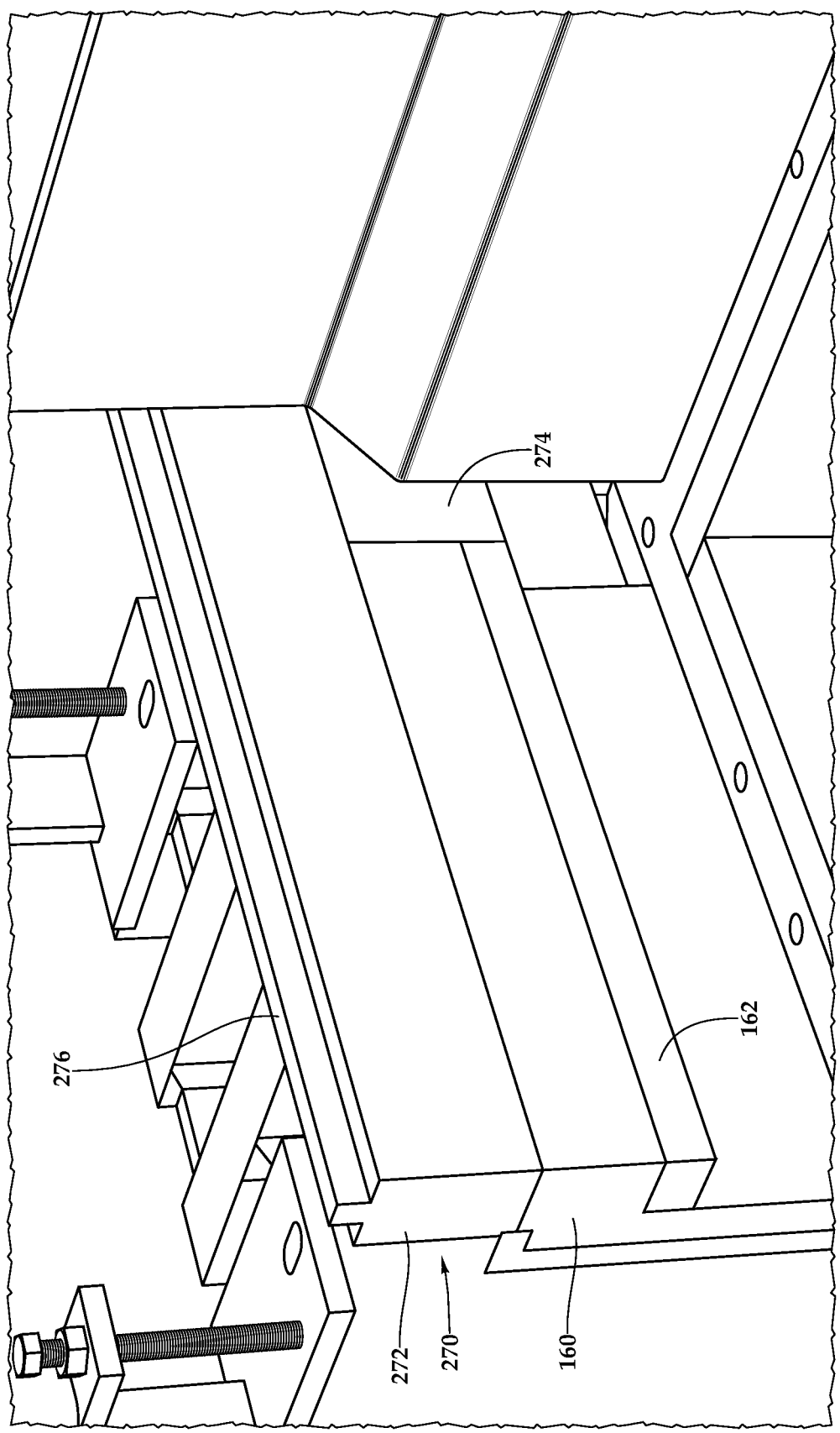
FIG. 7 shows another perspective view of a portion of an exemplary stationary guide of a baler assembly for engaging an exemplary moving guide.

Referring to FIGS. 6-7, perspective views of a portion of an exemplary stationary guide 270 of a baler assembly 10 for engaging an exemplary moving guide 230 are shown. The baler 10 may include a plurality of stationary guides 270, which may include an upper guide member 272 and a support guide member 274. The upper guide member 272 may include a tongue 276 extending from an upper surface 275 of the upper guide member 272. The tongue 279 may provide a track upon which the moving guide 230 may slide as the traveling chute 200 moves between various operational positions during the baling process.

The upper guide member 272 may be any suitable shape for engaging the channel 239 of the moving guide 230. In some embodiments, the upper guide member 272 is substantially cuboid shaped with tongue 276 protruding from its upper surface 275. Other shapes also may be used. The upper guide member 272 may be dimensioned to support the weight of the traveling chute 200 and also to maintain alignment of the traveling chute 200 when engaged with a moving guide 230. For example, the upper guide member 272 may have a height between about 2 inches and about 12 inches, preferably between about 3¼ inch and about 8 inch, and even more preferably between about 3½ inches and about 6 inches. In addition, the upper guide member 272 may have a width between about 1 inch and about 7 inches, preferably between about 1¼ inches and about 6 inches, and even more preferably between about 1½ inches and about 3½ inches. Finally, the upper guide member 272 may have a length between about 20 inches and about 80 inches, preferably between about 30 inches and about 70 inches, and even more preferably between about 40 inches and about 60 inches. In the illustrated embodiment, the upper guide member 272 has a height of about 4 inches, a width of about 2 inches and a length of about 50 inches. Other sizes also may be used.

The tongue 276 may be any suitable shape for engaging the channel 239 of the moving guide 230. For example, the tongue 276 may be substantially rectangular, such as a rectangle or square shape, or other shapes may be used. In the illustrated embodiment, the tongue 276 is substantially square shaped. The tongue 276 may be dimensioned to maintain alignment of the traveling chute 230 when engaged with a moving guide 230. For example, the tongue 276 may have a height between about ¼ inch and about ⅞ inch, preferably between about ⅓ inch and about ¾ inch, and even more preferably between about ½ inch and about ⅝ inch.

In addition, the tongue 276 may have a width relative to the overall width of the upper guide member 272 so as to provide adequate area on the upper surface 275 of the member 272 to engage the insert 238. For example, the tongue 276 may be between about ⅕ and about ⅔ as wide as the upper guide member 272, preferably between about ¼ and about ½ as wide as the upper guide member 272, and even more preferably about ⅓ as wide as the upper guide member 272. In the illustrated embodiment, the tongue 276 is substantially square shaped having a height and width of about ⅝ inch, which corresponds to about ⅓ of the width of the upper guide member 272. Other sizes also may be used.

In some embodiments, the tongue 276 may be substantially centered on the upper surface 275 of the upper guide member 272. Alternatively, the tongue 276 may be positioned elsewhere on the upper surface 275, such as at one side or the other. Other positions also may be used.

The support guide member 274 may be any suitable shape for supporting the upper guide member 272 and the weight of the traveling chute 200. In some embodiments, the support member 274 is substantially cuboid shaped. Other shapes also may be used. The support guide member 274 may have a height between about 1 inch and about 10 inches, preferably between about 1½ inches and about 8 inches, and even more preferably between about 2 inches and about 6 inches. In addition, the support guide member 274 may have a width between about 1 inch and about 7 inches, preferably between about 1¼ inches and about 6 inches, and even more preferably between about 1½ inches and about 3½ inches. Finally, the support guide member 274 may have a length between about 15 inches and about 65 inches, preferably between about 20 inches and about 55 inches, and even more preferably between about 25 inches and about 45 inches. In the illustrated embodiment, the support guide member 274 has a height of about 3½ inches, a width of about 2 inches and a length of about 35¼ inches. Other sizes also may be used.

3.0 Exemplary Bolster Assemblies

The baler assembly 10 (FIG. 8) may employ a variety of bolster assemblies 308. For example, the bolster assemblies described in U.S. Pat. No. 9,878,511 issued Jan. 30, 2018 and U.S. Pat. No. 10,189,224 issued Jan. 29, 2019, both of which are incorporated by reference in their entirety, may be used. Alternatively or additionally, other bolster assemblies also may be used.

4.0 Bale Forming Methods

Referring to FIGS. 8-11, during normal operation, rubber crumbles or other compressible materials may be weighed and supplied to the press chamber 100 via a conveyor belt (not shown). As shown in FIG. 11, the traveling crumb box 210 may be positioned above the press chamber 100 at this time to provide a pathway for crumbles to enter the press chamber 100 to ensure that the full weighed amount of crumbles enters the press chamber 100.

Next, the traveling chute 200 may slide across the stationary guides 270 until it is positioned such that the cover plate 224 may close off the top of the press chamber, which prevents rubber crumbles or other compressible materials from exiting the press chamber. In some embodiments, the cover plate 224 is positioned so as to allow a small gap between the cover plate 224 and the top of the press chamber 100. This gap may allow air to escape from the press chamber 100 during a bale forming operation and prevent the vapor lock and/or the formation of a "fluffy" bale. Preferably, the cover plate 224 is positioned to provide a gap between about ¹⁄₁₀₀ inches and about ¹⁵⁄₁₀₀₀ inches.

Next, the ram assembly 300 may be activated. Upon activation, hydraulic power may be applied to the ram assembly 300 such that the hydraulic rod travels in an upward direction, forcing the bolster assembly 308 into the press chamber 100. The baler press assembly 10 may be powered by a hydraulic power unit (not shown). The compression force applied by the ram assembly 300 may be of sufficient magnitude to form a solid bale of the compressible material contained in the press chamber 100. For example, the compression force may be between about 1000 pounds per square inch (PSI) and about 1500 PSI and preferably about 1200 PSI for low Mooney crumbles. For high Mooney crumbles, the compression force may be between about 1500 PSI and about 3500 PSI, preferably between about 2000 PSI and about 3000 PSI. The dwell time, or duration of the compression period, may be between about 0.5 seconds and about 3 seconds for low Mooney crumbles, and in some embodiments about 1 second. For high Mooney crumbles, the dwell time may be between about 10 seconds and about 20 seconds, and in some embodiments about 15 seconds. Finally, the temperature of the press chamber may between about 120° F. and about 180° F., preferably between about 130° F. and about 155° F., depending on the type of material. During this time, the force of the bolster pushes the cover plate 224 such that the wear strip 227 presses against the wear bar 162 (FIG. 11).

Following formation of the bale 400, the traveling chute 200 may be repositioned to allow the formed bale 400 to be vertically ejected from the press chamber 100, as shown in FIGS. 13 and 14. Once the bale 400 is vertically ejected from the bale, the traveling crumb box 210 may be moved horizontally so that the bumper 212 horizontally ejects the bale 400 from the assembly 10. Next, the traveling crumb box 210 is moved back into positon between the chute 500 and the press chamber 100 and the entire process may be repeated to form additional bales.

5.0 Exemplary Bales

Exemplary bales are shown FIGS. 12-13, which show a low Mooney bale 400a and high Mooney bale 400b, respectively. As a result of performing the above described method and using the improved baling apparatuses and bolster assemblies 308 described herein, bales 400 of rubber (or other material) substantially free of imperfections and/or irregularities may be manufactured.

6.0 Exemplary Embodiment

In one embodiment, a baling apparatus for compressing a compressible material is provided. The baling apparatus 10 may include a hydraulic rod 302 and a press chamber 100 for receiving the compressible material. The baling apparatus also may include a stationary guide 270 having an upper surface 275 and a tongue 276 extending from the upper surface 275. The baling apparatus 10 also may include a traveling chute 200 for directing the compressible material into the press chamber. The traveling chute 200 may include a crumb box 210 for directing the compressible material into the press chamber 100, and the crumb box 210 may have a width. The traveling chute 200 also may include a moving guide 230 that extends laterally past the width of the crumb box 210, and the moving guide 230 may define a channel 239 that engages the tongue 276 of the stationary guide 270.

It is contemplated that the novel portions of the baler press assembly 10 could be used in any type of press assembly having a press chamber. Further, the scope of the invention is not considered limited to rubber balers, but instead could be used in the compression of a wide variety of materials.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A baling apparatus for compressing a compressible material, comprising:
    a hydraulic rod;
    a press chamber for receiving the compressible material;
    a stationary guide having an upper surface and a tongue extending from the upper surface; and
    a traveling chute for directing the compressible material into the press chamber, the traveling chute including:
        a crumb box for directing the compressible material into the press chamber, the crumb box having a width; and
        a moving guide that extends laterally past the width of the crumb box, the moving guide defining a channel that engages the tongue of the stationary guide.

2. The baling apparatus of claim 1, where the moving guide further includes an insert that defines the channel.

3. The baling apparatus of claim 2, where the insert is made of polyoxymethylene.

4. The baling apparatus of claim 1, where the channel has a length between about 10 inches and about 20 inches.

5. The baling apparatus of claim 1, where the tongue is substantially rectangular shaped and the channel is substantially rectangular shaped.

6. The baling apparatus of claim 5, where the channel has a width that is wider than a width of the tongue by between about ³⁄₁₀₀₀ inch and about ¹⁄₁₀₀ inch.

7. The baling apparatus of claim 6, where the channel has a height that is taller than a height of the tongue by between about ³⁄₁₀₀₀ inch and about ¹⁄₁₀₀ inch.

8. The baling apparatus of claim 1, where the channel has a height that is taller than a height of the tongue by between about 3/1000 inch and about 1/100 inch.

9. The baling apparatus of claim 1, where the tongue is substantially centered on the upper surface of the stationary guide.

10. A traveling chute for directing a compressible material into a press chamber of a baling apparatus for compressing the compressible material, the baling apparatus including a stationary guide having an upper surface and a tongue extending from the upper surface, the traveling chute comprising:
a crumb box for directing the compressible material into the press chamber, the crumb box having a width; and
a moving guide that extends laterally past the width of the crumb box, the moving guide defining a channel that engages the tongue of the stationary guide.

11. The traveling chute of claim 10, where the moving guide further includes an insert that defines the channel.

12. The traveling chute of claim 11, where the insert is made of polyoxymethylene.

13. The traveling chute of claim 10, where the channel has a length between about 10 inches and about 20 inches.

14. The traveling chute of claim 10, where the tongue is substantially rectangular shaped and the channel is substantially rectangular shaped.

15. The traveling chute of claim 14, where the channel has a width that is wider than a width of the tongue by between about 3/1000 inch and about 1/100 inch.

16. The traveling chute of claim 15, where the channel has a height that is taller than a height of the tongue by between about 3/1000 inch and about 1/100 inch.

17. The traveling chute of claim 10, where the channel has a height that is taller than a height of the tongue by between about 3/1000 inch and about 1/100 inch.

18. The traveling chute of claim 10, where the tongue is substantially centered on the upper surface of the stationary guide.

19. A method of forming a rubber bale, comprising:
providing a baling assembly including a stationary guide having an upper surface and a tongue extending from the upper surface;
providing a traveling chute for directing compressible rubber materials into a press chamber of the baling assembly, the traveling chute including a crumb box for directing the compressible material into the press chamber, the crumb box having a width, the traveling chute also including a moving guide that extends laterally past the width of the crumb box, the moving guide defining a channel that engages the tongue of the stationary guide,
moving the traveling chute to a first position;
inserting, into the press chamber through the crumb box, compressible rubber materials;
moving the traveling chute to a second position to close the press chamber;
compressing, in the press chamber, the compressible rubber materials with a bolster assembly to form a rubber bale;
moving the traveling chute to a third position to open the press chamber; and
ejecting the rubber bale from the press chamber.

20. The method of claim 19, where the moving guide further includes an insert that defines the channel and the insert is made of polyoxymethylene.

* * * * *